United States Patent Office 3,332,779
Patented July 25, 1967

3,332,779
NEUTRAL TASTING ALCOHOLIC MALT
BEVERAGE
Erik Krabbe, Webster Groves, and Cavit Akin, St. Louis, Mo., assignors to Falstaff Brewing Corporation, St. Louis, Mo., a corporation of Delaware
No Drawing. Filed Apr. 2, 1965, Ser. No. 445,266
9 Claims. (Cl. 99—31)

ABSTRACT OF THE DISCLOSURE

The preparation of a neutral tasting alcoholic substrate by yeast fermentation of unboiled, unhopped wort containing fermentable sugar.

This invention relates to alcoholic malt beverage and more particularly to formation of an alcoholic malt beverage or substrate or base which has a relatively neutral taste. More specifically the invention relates to the formation of a neutral alcoholic substrate from malt and cereal products and thereafter flavoring the neutral substrate with various flavoring substances.

Recently, various proposals have been made to provide flavored alcoholic beverages of various descriptions such as "Tom Collins," coffee, mint, cherry, etc. The technique of trying to achieve such flavored alcoholic products by the use of fermented liquor have resulted in a rather undesired feature of having the undesired normal beer or malt liquor flavor superimposed with a second desired flavor as those heretofore mentioned. So far one proposal is to ferment the normal beer and then eliminate the flavor of the beer by charcoal filtration. Another technique is to add the flavor agent into boiling wort at which time activated carbon is added to the kettle to remove color from the wort. When sufficient time has been allowed for extracting the flavor, the wort was filtered and then fermented.

In contrast to previous techniques, the present invention briefly contemplates preparing a neutral fermented substrate for an alcoholic malt beverage which does not require the step of attempting to remove the malt liquor or beer taste. Such an ideal neutral substrate or base alcoholic liquor is achieved by fermenting an extract of 10 to 35 weight percent unboiled, unhopped wort and 90 to 65 weight percent fermentable sugar (cerelose for example), based on the extract being water free. On a volumetric basis, one volume of unboiled, unhopped wort at 10 percent solids is added to three volumes of cerelose solution at 10 percent solids. Four grams of yeast (wet cake) per liter is suitable. The yeast may be the normal brewery yeast which has been washed to prevent carry over of hop bitter substances. The wort and cerelose are fermented preferably at a constant temperature of 13° C. After the fermentation is complete, the fermented extract is cooled to 3° C. and remains at that temperature for two or three days to end fermentation. Thereafter, the fermented extract is centrifuged and/or filtered to obtain the neutral base which then is ready for carbonation and flavoring. At this stage of processing the flavor of the fermented substrate is substantially neutral with no organoleptic impression of malt liquor. Generally, the flavoring syrup is added one volume to six volumes of neutral substrate or base.

It is therefore an important object of the invention to prepare a neutral tasting alcoholic substrate by fermentation.

It is another object of the invention to provide a neutral tasting alcoholic substrate by fermentation of wort from cereal products;

It is another object of the invention to provide a neutral tasting alcoholic substrate of malt liquor, flavored with various flavored syrups;

It is another object of the invention to provide a malt liquor with a distinct and harmonious organoleptic impression;

It is another object of the invention to provide a malt liquor flavored with a harmonious flavor without the impression thereto of being superimposed with malt liquor flavor;

It is a further object of the invention to provide a process for preparing a neutral tasting alcoholic substrate by fermentation of cereal products;

It is a further object of the invention to provide a process of preparing a neutral tasting alcoholic substrate by fermenting a composition containing wort made from cereal products and cerelose;

It is a further object of the invention to prepare a neutral tasting substrate by fermenting a solution or extract prepared by mixing 10 to 35 percent unboiled wort of barley malt with 90 to 65 percent corn syrup;

It is another object of the invention to provide a process for preparing neutral tasting alcoholic substrate by fermentation of an extract on a water free basis containing 10 to 35 percent by weight of malt wort and 90 to 65 percent by weight cerelose;

It is another object of the invention to prepare a flavorable, neutral tasting alcoholic substrate by fermentation of an extract containing 10 to 35 percent by weight unboiled wort from cereal products and 90 to 65 percent by weight corn syrup, and fermenting the extract, with the addition of 4 to 6 grams per liter of yeast, at a temperature of about 13° C.;

It is another object of the invention to provide a process of making a neutral tasting alcoholic substrate by making unboiled, unhopped wort from mash containing 60 percent malt and 40 percent grits and adding to each volume of unboiled, unhopped wort three volumes of cerelose solution along with 4 grams of yeast per liter, and thereafter fermenting the extract and cooling the fermented extract to at least 3° C. and maintaining said extract at the same temperature for two or three days, separating the fermented extract or alcoholic substrate, and thereafter carbonating and flavoring the neutral substrate.

These and other objects and advantages of the invention will be appreciated from the ensuing detailed description of the preferred embodiment along with the appended claims.

In preparing the neutral substrate of the invention for the purpose of providing a flavorable base, various preferred steps are provided.

Brewing

A mash is prepared in a manner similar to that employed for making beer and ale except that such mash preferably contains at least 60 percent malt. The mash is heated to 105° F. for a period of 30 minutes to achieve proteolytic conversion, heated to 160° F. for a period of 30 minutes to achieve amylolytic conversion and then to 175° F. for destruction of enzymes. After the mashing operation, the liquid or first wort is removed from the masher. The first wort, preferably is used, however, all of the wort from the mash may be used. It will be understood that the wort is not boiled and is not flavored with hop. It has been discovered that by using unboiled wort no undesired cultivation of flavor-imparting substances occurs that would require later removal before flavoring. Consequently, undesired flavor is not imparted to the wort and will not cultivate during fermentation.

Fermentation

Preferably one volume of unboiled, unhopped wort (10 percent solution) is mixed with three volumes of dextrose, preferably cerelose, solution (10 percent solution), and then four to six grams of yeast per liter is added to the extract of wort and cerelose. The volume of cerelose may be varied from about 2.5 to 3.5 volumes. The normal brewery yeast may be used, however, it should be thoroughly washed to prevent carry over of hop bitter substances. The yeast, of course, should be supplied with nutrients that will not cause undesirable fermentation flavors. Suitably, fermentation agents are various members of the species *Saccharomyces cerevisiae* and specifically, the *Saccharomyces carlsbergensis*. However, the species *Aspergillus oryzae* may be used and will assist in achieving a very high alcohol content substrate. One of the purposes of using unboiled malt wort is that it is free from contributing undesired flavors whereas boiling the wort tends to increase cultivating undesired flavors. During the fermentation process it may be necessary on occasions to adjust the pH of the extract to remain between 3.8 to 4.0 pH, the optimum range for fermentation without too much slow down. The pH may be maintained by a buffering agent which may be mixtures of primary and secondary phosphates of potassium or ammonium. The pH may be maintained by direct addition of sodium hydroxide. Optimum results may be achieved by combining the sodium hydroxide pH control along with the pH control by addition of primary and secondary phosphates. The fermentation temperature of the extract of wort and cerelose is maintained preferably constant at 13° C., but at least within a temperature range of 11° to 15° C. The fermented extract or substrate will have an alcohol content of approximately five percent by volume, but could have an alcohol content from 2 to 10 percent by volume. Next the substrate or base is cooled to 3° C. and held for two to three days after which the substrate is centrifuged and/or filtered to remove all possible traces of yeast and other solids.

Numerous batches of the substrate or base have been made, carbonated and flavored in accordance with the procedures herein described. The table following gives specific examples of various process variables used in making substrates that were carbonated and flavored.

After the substrate has been fermented and thereafter filtered and centrifuged, the substrate is neutral tasting and may be characterized in contrast to regular beer by the comparison analysis which follows.

COMPARISON ANALYSIS

| Material | Neutral base | Competitive beer analysis | |
|---|---|---|---|
| | | Low value | High value |
| Apparent extract | 0.99 | 2.1 | 3.5 |
| Alcohol, percent by weight | 3.16 | 3.4 | 3.9 |
| Real extract | 2.43 | 3.7 | 5.1 |
| Original extract (Calc.) | 8.7 | 10.7 | 12.2 |
| R. D. fermentation | 71.9 | 57.0 | 65.5 |
| Color SRC | 0.5 | 2.1 | 3.8 |
| pH | 3.60 | 4.0 | 4.6 |
| Total acidity (lactic, percent) | 0.12 | 0.11 | 0.16 |
| Protein, percent | 0.08 | 0.24 | 0.45 |
| Red. sugars, percent maltose | 1.44 | 0.80 | 1.65 |
| Dextrins, percent (calc.) | 0.70 | 2.1 | 3.1 |
| Iodine reaction | Neg. | | |
| Calcium, p.p.m. | 32 | 26 | 110 |
| Chloride, p.p.m. | 118 | 150 | 450 |
| Copper, p.p.m. | <0.05 | | 0.60 |
| Iron, p.p.m. | 0.69 | | 0.30 |
| Sodium, p.p.m. | 115 | 25 | 200 |
| Diacetyl, p.p.m. | 0.19 | | 0.4 |
| Isohumulones, p.p.m. | None | 11 | 24 |
| Tannin, p.p.m. | 100–120 | 200 | |

Preparation of flavored substrate

The neutral tasting substrate or base may then be carbonated in accordance with the well known carbonation techniques. Next, the flavored syrup is added to the base, preferably one volume of flavoring syrup is added to six volumes of neutral substrate.

The syrup addition is preferably fermentable sugar such as cane sugar. After fermentation has been completed, the cane sugar is added in an amount of 4 to 14 percent by weight. This is decidedly different than adding such prior to fermentation or with boiled wort. Preferably the flavored alcoholic beverage will contain 5 to 7 percent by weight cane sugar. Furthermore, the beverage may contain equivalent amounts of calcium cyclamate or saccharin instead of cane sugar. Small amounts of citric acid and flavor concentrates up to one percent by weight each are added along with cane sugar. However, other mild organic acids such as fumaric, tartaric or malic may be used.

The ensuing Table II typifies the flavored compositions.

TABLE II
[Additions to 100 ml. neutral substrate]

| Example No. | Sucrose, grams | Citric acid, grams | Flavoring, ml. |
|---|---|---|---|
| 1 | 5.87 | 0.076 | 0.066 |
| 2 | 4.74 | 0.123 | 0.67 |
| 3 | 6.95 | 0.120 | 0.65 |
| 4 | 6.95 | 0.075 | 0.13 |
| 5 | 6.95 | 0.15 | 0.13 |
| 6 | 9.00 | 0.175 | 0.152 |

NOTE.—Examples 1, 2 and 3 were tangerine flavored, and Examples 4, 5 and 6 were black raspberry flavored.

TABLE I.—PROCESS VARIABLES

| Example No. | Vol. of 10% sol. of carbohydrate added to one vol. of 10% sol. of unhopped wort | Source of carbohydrate | Fermentation temp., 0° C. | Pitching rate, twice washed yeast, gm./l. |
|---|---|---|---|---|
| | 3.5 | Glucose | 13–15 | 6 |
| | 3 | do | 13 | 6 |
| | 3 | do | 13–15 | 6 |
| | 3 | High conversion corn syrup. | 13–15 | 4 |
| | 3 | do | 13 | 4 |
| | 3 | Cerelose | 13 | 4 |
| | 3 | do | 13 | 4 |
| | 3 | do | 13 | 4 |
| | 2.8 | do | 13–15 | 4 |

Of course, it will be understood that the flavored syrup may be any of the well known syrup currently used in the soft drink industry as well as other flavored syrups. Moreover, the flavored syrup may be added before or after carbonation. Furthermore, the exact ratio of flavored syrup may be changed to suit the particular sweetness requirement of the final malt liquor product. After addition of flavoring and carbonation, the flavored alcoholic beverage is then ready for bottling and etc.

It will be appreciated and understood that various changes and modifications to the process will be readily apparent to those skilled in the art, and all such changes and modifications are deemed to be within the scope and spirit of the invention as defined by the appended claims.

What is claimed is:

1. The method of making a neutral tasting alcoholic substrate comprising the steps of: extracting from a conventionally prepared mash containing at least 60 percent malt an unboiled, unhopped wort; adding fermentable sugar and adjusting the mixture to a ratio on a water-free basis of 10 to 35 percent by weight of the unboiled, unhopped wort and 90 to 65 percent by weight of fermentable sugar; subjecting said latter unboiled, unhopped wort and sugar mixture to brewery yeast to promote fermentation; allowing the last named mixture to ferment to completion at a temperature maintained in a range which has a high end of about 16° C.; cooling the fermented mixture; and separating solids from the fermented mixture to obtain the neutral tasting alcoholic substrate.

2. The method of making a neutral tasting alcoholic substrate as defined in claim 1, wherein the total solids present in said last named mixture are about 10 percent.

3. The method of making a neutral tasting alcoholic substrate comprising the steps of: extracting from a conventionally prepared mash containing at least 60 percent malt an unboiled, unhopped wort; adding cerelose solution and adjusting the mixture to a ratio of one volume of unboiled, unhopped wort at about 10 percent solids and three volumes of cerelose solution also at about 10 percent solids; subjecting said adjusted mixture to brewery yeast to promote fermentation; allowing the last named mixture to ferment to completion at a temperature which has a high end of about 16° C.; cooling the fermented mixture; and removing solids from the fermented mixture to obtain the neutral tasting alcoholic substrate.

4. The method of making a neutral tasting alcoholic substrate comprising the steps of: extracting from conventionally prepared mash containing at least 60 percent malt an unboiled, unhopped wort; mixing together the unboiled, unhopped wort and glucose such that the resulting mixture contains 10 to 35 percent by weight wort and 90 to 65 percent by weight glucose on a water-free basis; subjecting the last named mixture to *Saccharomyces carlsbergensis* to promote fermentation; allowing the last named mixture to ferment to completion with the temperature of fermentation maintained within a range of substantially 11° C. to 16° C.; cooling the fermented extract to about 3° C.; and then separating solids from the fermented mixture to obtain the neutral tasting alcoholic substrate.

5. The method of making a neutral tasting alcoholic substrate comprising the steps of: extracting from conventionally prepared mash containing at least 60 percent malt an unboiled, unhopped wort; mixing together the unboiled, unhopped wort and glucose such that the resulting mixture contains 10 to 35 percent by weight wort and 90 to 65 percent by weight glucose on a water-free basis; subjecting the last named mixture to *Saccharomyces cerevisiae* to promote fermentation; allowing the last named mixture to ferment to completion with the temperature of fermentation maintained within a range that may be as low as about 11° C. and as high as about 16° C.; cooling the fermented extract to about 3° C.; and then separating solids from the fermented mixture to obtain the neutral tasting alcoholic substrate.

6. The method of making a neutral tasting alcoholic substrate comprising the steps of: providing a mixture of 60 percent malt and 40 percent corn grits; mashing the mixture in water to obtain an unboiled, unhopped wort; mixing together on a water-free basis 10 to 35 percent by weight of the unboiled, unhopped wort and 90 to 65 percent by weight of glucose; subjecting the last named mixture to yeast selected from the species of *Saccharomyces carlsbergensis* to promote fermentation; allowing the last named mixture to ferment to completion with the temperature of fermentation maintained at a high of about 16° C.; cooling the fermented last named mixture and separating solids therefrom to obtain the neutral tasting alcoholic substrate.

7. The method of making a neutral tasting alcoholic substrate comprising the steps of: providing a mixture of 60 percent malt and 40 percent corn grits; mashing the mixture in water to obtain unboiled, unhopped wort; mixing together on a water-free basis 10 to 35 percent by weight of the unboiled, unhopped wort and 90 to 65 percent by weight of glucose; subjecting the last named mixture to yeast selected from the species of *Saccharomyces cerevisiae* to promote fermentation; allowing the last named mixture to ferment to completion with the temperature of fermentation maintained at a level of about 16° C.; cooling the fermented last named mixture and separating solids therefrom to obtain the neutral tasting alcoholic substrate.

8. The method of making a neutral tasting alcoholic substrate comprising the steps of: extracting an unboiled, unhopped wort from a mash of at least 60 percent malt; adding together on a water-free basis 10 to 35 percent by weight of said unboiled, unhopped wort and 90 to 65 percent by weight of hydrolyzed starch; subjecting the last named mixture to brewery yeast to promote fermentation; allowing the last named mixture to ferment to completion at a temperature variable in the range of from about 11° C. to about 16° C. and a pH between 3.8 and 4.0 maintained by additions of primary and secondary phosphates of potassium and ammonia; cooling the fermented last named mixture and separating solids therefrom to obtain the neutral tasting alcoholic substrate.

9. The method of making a neutral tasting alcoholic substrate comprising the steps of: extracting unboiled, unhopped wort from a mash of at least 60 percent malt; mixing together on a water-free basis 10 to 35 percent by weight of unboiled, unhopped wort and 90 to 65 percent by weight of hydrolyzed starch; subjecting the thus resulting mixture to brewery yeast to promote fermentation; allowing the thus resulting mixture to ferment to completion with the temperature maintained substantially within the range of about 11° to 16° C. and with the pH maintained between 3.8 and 4.0 by additions of substances selected from the group consisting of primary and secondary phosphates of potassium and ammonia, sodium hydroxide and mixtures of said substances; cooling the thus resulting mixture and separating solids therefrom to obtain the neutral tasting alcoholic substrate.

References Cited

UNITED STATES PATENTS

| 2,107,529 | 2/1938 | Fetzer | 99—50 |
| 2,126,133 | 8/1938 | Paine et al. | 99—50 |
| 2,206,719 | 7/1940 | Draeger | 99—30 |

FOREIGN PATENTS

| 382,048 | 10/1932 | Great Britain. |

A. LOUIS MONACELL, *Primary Examiner.*

D. M. NAFF, *Assistant Examiner.*